United States Patent Office 3,461,674
Patented Aug. 19, 1969

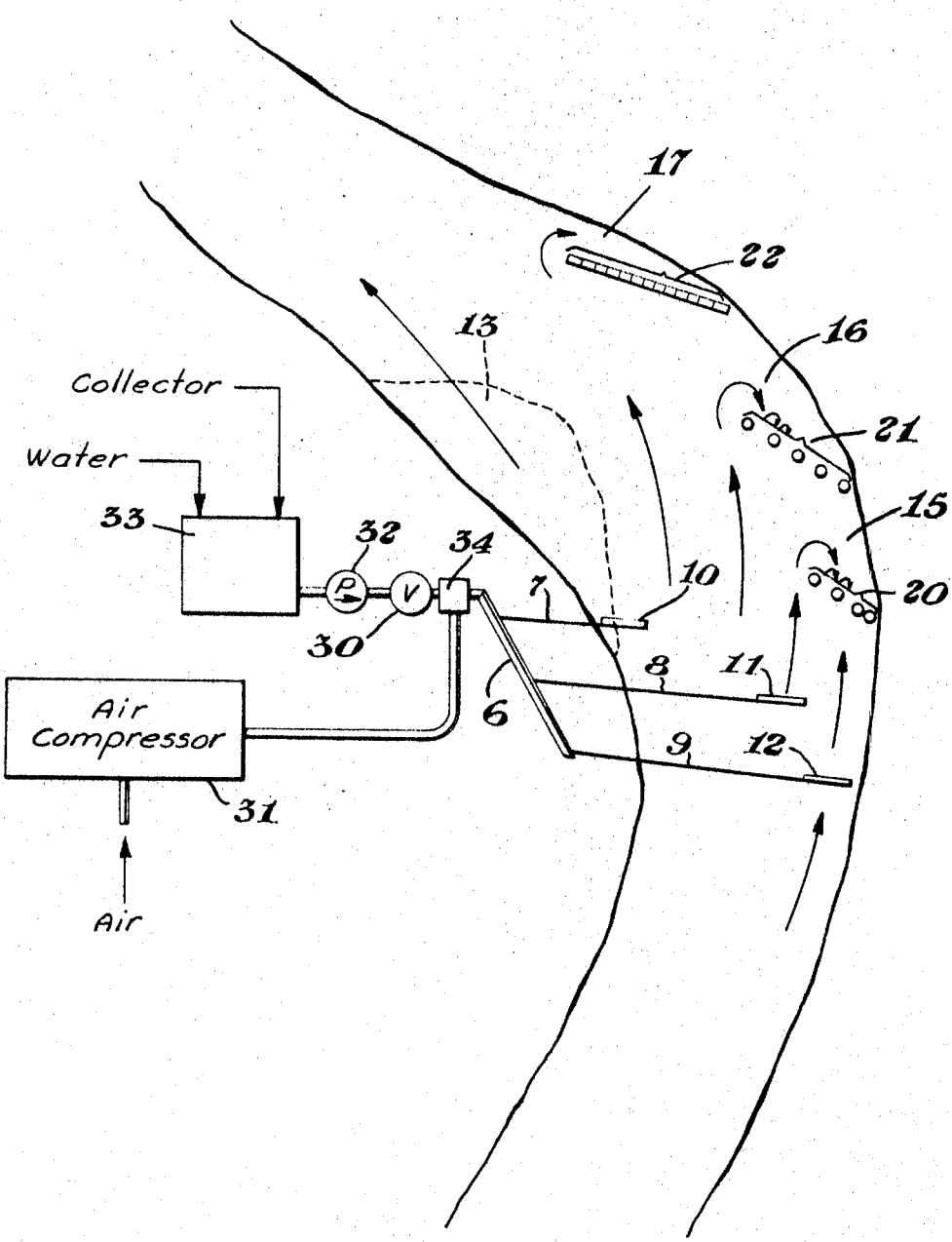

3,461,674
RIVER MANAGEMENT
Melvin F. Katzer, Danville, and David J. Pye, Alamo, Calif., assignors to The Dow Chemical Company, Midland, Mich., a corporation of Delaware
Filed Jan. 20, 1967, Ser. No. 610,586
Int. Cl. E02b 3/02
U.S. Cl. 61—2                                    10 Claims

ABSTRACT OF THE DISCLOSURE

The present invention involves contacting bed-load solids, which normally saltate along river bottoms, with a gas, such as air, thereby floating such solids upward into the river current. The solids are subsequently settled in earth fills designed for river diversion or simply as settling reservoirs for flocculated solids. The process also may be used for deepening rivers.

---

Navigational river waters are continually under improvement. Among projects directed to this end are some intended to deepen or straighten the rivers. It has also been proposed to clarify the water by settling the suspended solids in rivers. See for example, Katzer et al. U.S. Patent No. 3,118,832.

One technique by which the meandering course of a river is corrected involves creating earth fills along the river banks by introducing one or more baffles, extending from a river bank, into the river current. Downstream from the baffle, the velocity of the river current is reduced and energy dissipating eddies are formed. As water carrying suspended solid matter comes into these eddies, sufficient energy is lost to permit the settling of the solids. Over a period of time, substantial earth fills can be created in this manner.

Suitable placement of such fills will result in desired narrowing and straightening of the river course, or in general, any desired filling of the river. In such instances, the fills are the desired object of the process.

Alternately, the earth fills will be created to function as solids settling reservoirs for the flocculation of naturally suspended silt in clarification of the river water. Fills containing solid matter, which was once naturally suspended in water, settle and compact very slowly. As a consequence, these settled solids are readily washed away. Extreme washing may occur during flood periods.

It would be desirable, and it is an object of the present invention to provide an improved process for creating earth fills in rivers. Particularly, it is an object to enhance the rate at which the fills for river diversion are formed. An additional object is to increase the compaction rate of earth fills used as settling reservoirs to minimize erosion losses. Still further objects are to deepen river courses and enhance the scouring action of the river. These objects and other benefits as will become apparent hereinafter, are achieved in the present invention.

The process of the invention comprises contacting river bed-load solids in the proximity of the river bottom with a gas whereby such solids are floated up into the river current and carried thereby to a removed settling zone. "River bed-load solids" are the larger or denser solids found moving or saltating along river bottoms, as contrasted with "suspended solids," which are essentially uniformly dispersed in the river water. The settling zone may be artificially created or a natural settling zone in the river current. Its utilization in the invention can be for river diversion and control of the river contour, or it may be intended for the collection of flocculated solids. Once the floated bed-load solids come within a settling zone, they are subject to the same settling forces as apply to naturally suspended solids, and they settle along with the smaller suspended solids, thereby increasing the average density and rate of formation of the solids fill. Preferably, flocculants are utilized to enhance the settling rate of solids in such fills.

An artificial settling zone is created by placing a baffle in the river current. The baffle may be continuous in the sense it extends as an essentially continuous surface into the river current for several feet or more, or it may be simply a discontinuous series of pilings, or similarly functioning obstructions to flow, spaced apart on a line, or lines, in the river current. A natural settling zone will be located in the river at a position where the velocity and the turbulence are insufficient to maintain the solids in suspension.

In one embodiment of the invention, the bed-load solids are contacted with a flotation aid, as well as a gas. Suitable for this purpose are organic collectors which promote the adherence of the air bubbles to the solids. When carrying out the invention in this manner, the collector can be applied to the river bed-load solids either before, or simultaneously with, the application of the gas. Preferably the collector and gas are dispersed, if not largely dissolved in, water at an elevated pressure. Injection of the gas, and collector into the river is carried out in the proximity of the river bed; illustratively, at or below the level of the river bed for efficient contacting thereof with the moving river bed-load solids. For economic reasons, the gas employed will usually be air, but any other gas such as oxygen, nitrogen and the like can be used if desired.

In the interest of economy and efficiency of operation, the gas, and the optional flotation collector, will be introduced into the river at a plurality of points in a direction generally transverse to the direction of the river current. Since the river current is relied upon to carry floated bed-load solids into the settling zone, the gas is applied to bed-load solids upstream from the settling zone on a line or lines that generally parallel the direction of current.

The invention may be used for several distinct objects. One of these is the creation of earth fills along river banks for the purpose of altering the course of the river. Another is the deepening of the river channel. This occurs as the floated bed-load solids are replenished by the scouring action of the river. By properly placing the flotation means upstream from sand bars and similar deposits in a river bed, the scouring action of the river and consequent replenishment of the bed-load solids may be used to diminish and remove such sand bars. Still another use of the invention is the improved flocculation of highly suspended matter by mixing therewith bed-load solids whose higher density yields a faster settling and compacting floc.

The accompanying drawing schematically illustrates the application of the instant invention to the above mentioned objects. In particular, an aqueous dispersion of an organic flotation collector, contained in a holding tank 33, is pumped by pumping means 32 into an air-water mixing vessel 34 under air pressure supplied by an air compressor 31. The resulting aerated aqueous dispersion then flows into a distributing header 6, which feeds disperser lines 7, 8 and 9. These are connected to disperser sections 10, 11 and 12, respectively. The latter can be simply capped pipes having a plurality of small perforations along their length at intervals of from about 0.5 to 2 inches. Preferably, the dispersers are porous pipes through which gaseous or dissolved air and collector uniformly diffuse into the river water. The length of a disperser will depend upon the overall plan for deepening the river and the creation of the fills. Desirably, the dispersers will be held in place at the river bottom, as by the use of suitable anchors.

As bed-load solids flow over the operating dispersers some will capture air bubbles and be floated up into the river current, the direction of which is illustrated by the arrows. The current carries the rising bed-load solids into a settling zone downstream from the disperser. As the result of energy loss in the settling zone, the bed-load solids are settled along with naturally suspended solids that may be present in the river current. The settled combination of the solids, i.e. the higher density and larger sized river bed-load solids with the highly suspended or colloidal, solids, results in a fill of substantially improved resistance to washing or erosion.

In the drawing three fills or settling zones are formed downstream from the disperser sections 11 and 12. Settling or fill zones 15 and 16 are created by baffles 20 and 21 consisting of an aligned series of pilings spaced at five foot intervals in the river bed. Fill zone 17 is defined by a baffle 22 in the form of an essentially continuous wall of abutting pilings.

The form or type of baffle used is not a consideration of essential importance to achieve the benefits of the invention. When forming fills to alter the course or contour of the river, the baffle is preferably lengthened into the river current by increments over a period of time. As the fill forms behind an existing section, another section is added until the desired earth fill is obtained.

When the baffle is used to cause settling for the purposes of river clarification, it can be positioned any place in the river. Preferably, one or more such baffles will be placed in the river so that the entire volume of the river will flow through one settling zone or another. As necessary, the settling zone will be maintained by removal of the settled solids behind the baffle.

It is possible to operate the above process to considerable advantage with only the use of a gas. When operated in this manner, valve 30 is closed and the air compressor 31 is operated alone. The compressed air flows through the feed lines into the dispersers. Bed-load solids are contacted with diffusing bubbles of air, which are adsorbed or entrained in many of the bed-load solids causing them to float up into the river current. Subsequently they are captured in one or more settling zones.

In addition to floating bed-load solids into the river current for the purposes of promoting more rapidly forming and stable earth fills for river course diversion and enhancing flocculation of naturally suspended solids, the process of the invention may be used to deepen river courses or remove sand bars therefrom. The latter application is illustrated by the placement of disperser section 10 in the accompanying drawing. As saltating bed-load solids are floated into the river current, the river replenishes such solids by erosion of the submerged sand bar 13. Over a period of time, the sand bar will be eroded away and its reformation prevented by the continued practice of the process. The floated solids in this instance will be carried downstream into natural settling zones not illustrated.

Various other modes of operation will readily occur to those skilled in the art. For instance, it is possible to apply the collector and air to the bed-load solids through separate distribution systems. Moreover, numerous variations are possible in the design and layout of dispersers. In another mode of operation, the system shown in the accompanying drawing can be efficiently operated by operating just disperser section 12.

As will be manifest, the distance between the disperser and the downstream baffle or natural settling zone will vary according to the depth of the river and velocity of current. Consequently, appropriate adjustments are made to permit bed-load solids to rise high enough above the river bed to permit their deposition in desired fill zones. In streams where the current is fairly rapid, as for example from 5 to 10 miles per hour, it may be desirable to position the disperser sections at least about 200 yards upstream from the baffles. At slower current rates, e.g. from 0.5 up to 2 miles per hour, such means may be positioned somewhat closer to the settling zone in order to capture the optimum amount of floated bed-load solids.

Reagents useful in promoting the flotation of bed-load solids for the purposes of the present invention are well known to the art. Since the bed-load solids will usually vary widely in their surface charge characteristics, collectors that may be used to enhance the absorption characteristics of such solids for gas bubbles may be any one of, or compatible combination of, the various known anionic, cationic, and non-ionic organic reagents classified as "collectors" or "frother-collector combinations" in the flotation art. These reagents are described by Klassen and Mokrousove in "An Introduction to the Theory of Flotation," London, Butterworth's (1963), pp. 151–155. Such collectors include organic acids and their salts, thio-compounds, organic derivatives of ammonium hydroxide and oils. Examples are oleic acid, sodium alkyl sulfonates, sodium alkyl phosphates, naphthylamine, laurylamine, alkyl ammonium acetate, alkylamine, dialkylamine and trialkylamine and alkanol amines. In the foregoing examples, the alkyl groups contain sufficient carbons to provide a hydrophobic-hydrophilic balance such that the compound is at least somewhat soluble in water but because of a hydrophobic portion, it decreases the water wettability of the surface to which the collector is attached through a polar group. Polar groups are not essential for operability, however, because many liquid hydrocarbons will also adsorb on solids thus increasing their amenability to flotation.

It may become desirable to increase the efficiency of the recovery of floated solids in a settling zone by applying a depressing reagent to the floated solids. A number of inorganic reagents are known for this purpose. They can be applied simply by spraying them on the water surface in the form of an aqueous solution.

Settling of the solids in the settling zone is preferably enhanced by applying a water-soluble, flocculant to the suspended solids with sufficient agitation to induce efficient coagulation thereof. A large number of inorganic chemicals and synthetic organic polyelectrolytes are known to be useful for this purpose. The flocculant will be mixed into the river downstream from where the gas is introduced but prior to the settling zone. If the flocculant is introduced just ahead of the baffles, the turbulence of the river current will provide some, or all, of the agitation necessary for effective flocculation.

Suitable flocculants include inorganic reagents such as ferric chloride, alum and lime. Most effective are the high molecular weight water-soluble polyelectrolytes. Examples of the latter are polyalkylene polyamines, polyacrylamides, poly(aminoalkylesters of acrylic acid), polyacrylic acid and its alkali metal salts, copolymers of acrylamide and acrylic acid, styrene and maleic acid copolymers and alkali metal salts thereof, polystyrene sulfonates and in general any of the water-soluble polymers of sufficient molecular weight to perform as flocculants.

What is claimed is:

1. A method which comprises contacting saltating river bed-load solids in the proximity of the river bottom with a gas to float said solids upward into the current of the river and transporting said solids by means of the river current into a removed settling zone.

2. The method of claim 1 including additionally contacting said solids with a flotation collector chemical.

3. A method as in claim 1 wherein the contacting of bed-load solids with the gas is done just upstream from a sand bar whereby the river current in replenishing its bed-load erodes the sand bar.

4. The method as in claim 1 and including contacting said floated solids with a flocculating agent to enhance settling thereof in the settling zone.

5. A method as in claim 4 for river clarification wherein the flocculating agent is mixed with the floated bed-load solids and any suspended solids present in the river water upstream from the settling zone whereby the river turbulence induces flocculation of the solids.

6. A method as in claim 4 and including the additional step of removing settled solids from the settling zone.

7. The method as in claim 1 for river diversion wherein the settling zone is defined by means of a baffle placed in the river current.

8. The method of claim 7 including the step of contacting said solids with a flotation collector chemical.

9. A method as in claim 7 and including the additional step of introducing a flocculating agent into the river upstream from the settling zone to enhance the settling rate of solids.

10. A method as in claim 1 wherein the gas is introduced into the river, at least in part, as a water solution from which the gas evolves in the proximity of the bed-load solids.

References Cited

UNITED STATES PATENTS

| | | | |
|---|---|---|---|
| 510,713 | 12/1893 | Scott | 61—2 X |
| 534,919 | 2/1895 | Sewall | 61—4 |
| 3,063,939 | 11/1962 | Katz | 210—44 |
| 3,118,832 | 1/1964 | Katzer et al. | 210—54 |
| 3,234,123 | 2/1966 | Hinde | 61—6 X |
| 3,293,861 | 12/1966 | Hinde | 61—6 X |

EARL J. WITMER, Primary Examiner